United States Patent
Ruffini et al.

(10) Patent No.: US 10,057,867 B2
(45) Date of Patent: Aug. 21, 2018

(54) METHOD AND APPARATUS FOR SYNCHRONISING A PLURALITY OF DISTRIBUTED DEVICES WITH A NETWORK

(71) Applicant: Telefonaktiebolaget LM Ericsson (publ), Stockholm (SE)

(72) Inventors: Stefano Ruffini, Pisa (IT); Per-Erik Eriksson, Stockholm (SE); Zere Ghebretensaé, Stockholm (SE); Ioanna Pappa, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/503,591

(22) PCT Filed: Aug. 14, 2014

(86) PCT No.: PCT/EP2014/067428
§ 371 (c)(1),
(2) Date: Feb. 13, 2017

(87) PCT Pub. No.: WO2016/023589
PCT Pub. Date: Feb. 18, 2016

(65) Prior Publication Data
US 2017/0245228 A1    Aug. 24, 2017

(51) Int. Cl.
*H04W 56/00*    (2009.01)
*H04L 12/28*    (2006.01)

(52) U.S. Cl.
CPC ....... *H04W 56/001* (2013.01); *H04L 12/2801* (2013.01)

(58) Field of Classification Search
CPC .................. H04W 56/001; H04L 12/2801
See application file for complete search history.

(56) References Cited

U.S. PATENT DOCUMENTS

| 8,718,482 B1 | 5/2014 | Roberts et al. |
| 2010/0040369 A1 | 2/2010 | Zhao et al. |

(Continued)

FOREIGN PATENT DOCUMENTS

EP    2515592 A2    10/2012

OTHER PUBLICATIONS

Ruffini, Stefano et al., "Transport of Accurate Time Synchronization Over Access Technologies", International Telecommunication Union, COM 15-C 977-E, Ericsson, May 2010, 1-12.

(Continued)

*Primary Examiner* — Mohammad S Anwar
(74) *Attorney, Agent, or Firm* — Murphy, Bilak & Homiller, PLLC

(57) ABSTRACT

A method (100, 200) in a synchronization control unit is disclosed. The method enables synchronization of a plurality of distributed devices with a network and comprises the steps of receiving a wireless synchronization signal from a network node over a wireless channel (104, 204) and processing the received synchronization signal (108, 208). The method further comprises transmitting the processed synchronization signal to the plurality of distributed devices over a local connection which is different to the wireless channel over which the wireless synchronization channel is received (120, 220). Also disclosed are a synchronization control unit (300, 400) and a computer program product.

18 Claims, 8 Drawing Sheets

(56) References Cited

U.S. PATENT DOCUMENTS

| | | | | |
|---|---|---|---|---|
| 2010/0296555 | A1* | 11/2010 | Cahill | H04L 27/2601 375/219 |
| 2012/0134455 | A1* | 5/2012 | Wang | H04W 56/0015 375/354 |
| 2013/0039359 | A1* | 2/2013 | Bedrosian | H04J 3/0667 370/350 |
| 2013/0188601 | A1* | 7/2013 | Sun | H04W 36/14 370/331 |

OTHER PUBLICATIONS

SICON 2002Eidson, John et al., "IEEE 1588 Standard for a Precision Clock Synchronization Protocol for Networked Measurement and Control Systems", SIcon 2002, Nov. 18-21, 2002, 1-8.
Unknown, Author, "Add System Information acquisition requirement for inter-RAT E-UTRAN HeNB cell", 3GPP TSG-RAN WG4 Meeting #55, R4-102247, Montreal, Canada, May 10-15, 2010, 1-4.
Unknown, Author, "Corrections to CSG SI reading core requirement", 3GPP TSG-RAN4 Meeting #55, R4-102294, Montreal, Canada, May 10-14, 2010, 1-7.
Unknown, Author, "CRs for Enhanced Home NodeB / eNodeB", TSG-RAN Meeting #48, RP-100627, Seoul, Korea, May 31-Jun. 4, 2010, 1-2.
Unknown, Author, "Editorial modifications on TDD HeNB TR36.922", 3GPP TSG-RAN WG4 Meeting #55, R4-101961, Montreal, Canada, May 10-14, 2010, 1-69.
Unknown, Author, "Introduction of HNB test case", 3GPP TSG-RAN4 Meeting #55, R4-102255, Montreal, Canada, May 10-14, 2010, 1-3.
Unknown, Author, "RSRQ Idle Mode Requirements", 3GPP TSG-RAN4 Meeting #55, R4-102191, Montreal, Canada, May 10-14, 2010, 1-7.
Unknown, Author, "Series G: Transmission Systems and Media, Digital Systems and Networks Digital networks—Quality and availability targets—Availability performance parameters and objectives for end-to-end international constant bit-rate digital paths", ITU-T G.827, Sep. 2003, 1-26.
Unknown, Author, "Series G: Transmission Systems and Media, Digital Systems and Networks—Access networks—Metallic access networks Fast access to subscriber terminals (G.fast)—Physical layer specification", ITU-T G.9701, Dec. 2014, 1-324.
Unknown, Author, "Series G: Transmission Systems and Media, Digital Systems and Networks Digital networks—Quality and availability targets End-to-end error performance parameters and objectives for international, constant bit-rate digital paths and connections", ITU-T G.826, Dec. 2002, 1-34.
Unknown, Author, "Series G: Transmission Systems and Media, Digital Systems and Networks Digital sections and digital line system—Metallic access networks Very high speed digital subscriber line transceivers 2 (VDSL2)", ITU-T G.993.2, Jan. 2015, 1-430.
3GPP, "3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 11)", 3GPP TR 36.922 V11.0.0, Sep. 2012, 1-74.

3GPP, "3rd Generation Partnership Project; Technical Specification Group Radio Access Network; Evolved Universal Terrestrial Radio Access Network (E-UTRAN); S1 Application Protocol (S1AP) (Release 12)", 3GPP TS 36.413 V12.2.0 (Jun. 2014), Jun. 2014, 1-285.
3GPP, "3rd Generation Partnership Project; Technical Specification Group Services and System Aspects; Telecommunication management; Home enhanced Node B (HeNB) Operations, Administration, Maintenance and Provisioning (OAM&P); Information model for Type 1 interfac", 3GPP TS 32.592 V12.0.0 (Dec. 2013), Dec. 2013, 1-92.
IEEE, "IEEE Standard for a Precision Clock Synchronization Protocol for Networked Measurement and Control Systems", IEEE Std 1588-2008 (Revision of IEEE Std 1588-2002) IEEE Instrumentation and measurement Society Sponsored by the Technical Committee on Sensor Technology (TC-9) New York, NY, Jul. 24, 2008, 1-289.
ITU-T, "Network limits for time synchronization in packet networks Series G: Transmission Systems and Media, Digital Systems and Networks Packet over Transport aspects—Synchronization, quality and availability targets", ITU-T G.8271.1/Y.1366.1, Series Y: Global Information Infrastructure, Internet Protocol Aspects and Next-Generation Networks Internet protocol aspects—Transport, Aug. 2013, 1-38.
ITU-T, "Series G: Transmission Systems and Media, Digital Systems and Networks Digital sections and digital line system—Access networks Self-FEXT cancellation (vectoring) for use with VDSL2 transceivers", G.993.5 Recommendation ITU-T G.993.5, Apr. 2010, 1-80.
"Series G: Transmission Systems and Media, Digital Systems and Networks Digital sections and digital line system—Metallic access networks Self-FEXT cancellation (vectoring) for use with VDSL2 transceivers", Amendment 5: Exchange of transceiver IDs during initialization G.993.5 Recommendation ITU-T G.993.5, 2010, 1-10.
ITU-T, "Timing characteristics of telecom boundary clocks and telecom time slave clocks", G.8273.2/Y.1368.2 Series G: Transmission Systems and Media, Digital Systems and Networks Packet over Transport aspects—Synchronization, quality & availability targets, Series Y: Global Information Infrastructure, Internet Protocol Aspects and Next-Generation Networks Internet protocol aspects—Transport, May 2014, 1-36.
Mills, D. et al., "Network Time Protocol Version 4: Protocol and Algorithms Specification", Internet Engineering Task Force (IETF) Request for Comments: 5905 Obsoletes: 1305, 4330 Category: Standards Track ISSN: 2070-1721, Jun. 2010, 1-110.
Mills David L. "Network Time Protocol (Version 3) Specification, Implementation and Analysis", Network Working Group Request for Comments: 1305 Obsoletes: RFC-1119, RFC-1059, RFC-958, Mar. 1992, 1-120.
Unknown, Author "Document 075.07.01 LTE Synchronisation", Small Cell Forum Release 7.0 Produced in partnership with the Metro Ethernet Forum (MEF), Nov. 2013, 1-56.
Unknown, Author, "ITU-T Recommendation G.8273.4/Y.1368.4 Latest Draft", Editor Recommendation G.8273.4/Y.1368.4 Question: Q13; Study Group 15; Working Party 3: Intended type of document (R-C-TD): WD8273.4N Sunnyvale, Jun. 2-6, 2014, 1-8.

* cited by examiner

METHOD AND APPARATUS FOR SYNCHRONISING A PLURALITY OF DISTRIBUTED DEVICES WITH A NETWORK

TECHNICAL FIELD

The present invention relates to a method and an apparatus for synchronising a plurality of distributed devices with a network. The present invention also relates to a computer program product configured, when run on a computer, to carry out a method for synchronising a plurality of distributed devices with a network.

BACKGROUND

Applications for communication network technology and continuously expanding and increasing, and it is frequently necessary to synchronise various distributed devices with a network. This may be achieved by providing accurate timing information to the devices, enabling their synchronisation to a timing signal. Example devices which may need to be synchronised to a network include connected appliances in home and industrial environments. Such appliances may communicate over a cellular network with application servers that manage and configure the appliances. Further examples of devices requiring synchronisation include small cell basestations, particularly residential small cells and femtocells. Small cells are miniature basestations having reduced power output compared to macro basestations, and providing coverage or capacity extension to a communication network over a limited geographical area. Accurate timing information is particularly important for small cells, either to support Time Division Duplexing (TDD) technology used in the network or to minimise interference between small cells or between small cells and macro cells.

Various solutions for frequency and time or phase synchronisation have been proposed and defined by standardisation bodies, including the International Telecommunication Union Telecommunication Standardisation Sector (ITU-T) G.826x and G.827x series of recommendations. Two main approaches have been defined in these solutions, the first based on delivering frequency synchronisation over the physical layer. Synchronous Ethernet (SyncE) is an example of such an approach, in which clock signals are transferred over the Ethernet Physical Layer. The second approach involves delivering timing information (either frequency alone or frequency and time) via packets. The Precision Time Protocol, defined in IEEE 1588, is an example of a packet based synchronisation approach. The solutions defined by the standards bodies assume implementation in well managed telecommunication networks in which for example every node in the synchronization chain is expected to fulfill very strict requirements in terms of synchronization, or in the case of transparent transport of packets, with very strict constraints in terms of packet delay variation.

Various combinations of synchronization techniques have been proposed in order to improve performance and reliability of time synchronization. In one example, G8271.1 and G.8273.2 define an architecture in which IEEE1588 is combined with Synchronous Ethernet. In this case Synchronous Ethernet is be used to improve stability and to provide enhanced Holdover when the IEEE1588 reference is lost. In another example, a new work item in ITU-T is proposing to combine IEEE1588 carried over a network that is not able to process IEEE1588 with a GNSS source available at a base station. This scheme is known as "Assisted Partial Timing Support" (APTS) and will be specified in G.8273.4. An example configuration for APTS is illustrated in FIG. 1. During normal operation, the accurate GNSS reference (for example provided by a GPS receiver) provides a synchronization reference and may also be used to "calibrate" the noisy IEEE1588 signal which may be impacted by asymmetries in the network. During limited periods of time (for example 24 hours) during which the GNSS signal is lost, synchronization is maintained using the IEEE1588 signal.

In some deployment situations, the synchronization solutions described above may not be appropriate or may be difficult to implement. For example, the application of the ITU-T synchronization solutions to a femtocell or residential small cell environment is highly complex, owing at least in part to the presence of public internet segments, which may be used when connecting small cells to a network, and which segments cannot provide synchronization support.

FIG. 2 illustrates an example residential small cell deployment, in which various distributed devices 2 connect to a telecommunications network via a residential small cell 4. In one example deployment scenario, residential small cells are designed to be as simple as possible, reducing their cost and physical complexity. In such scenarios, only the following layers of the access spectrum may reside on a residential small cell providing Long Term Evolution (LTE) radio access: PHY, MAC and RLC. Other layers, including PDCP and RRC may be centralized, resulting in a very simple small cell structure when compared to standard femtocells or macro basestations. Traffic to and from the residential small cell may be in the form of encrypted PDCP PDUs carrying both data and signaling radio bearers. The encrypted PDCP PDUs may be mapped via an algorithmic procedure onto a packet infrastructure implemented through Ethernet, IPv6 or similar. More specifically, the PDCP PDUs may be provided with a MAC/IPv6 address and then switched to the centralized function. Each residential small cell thus comprises the reduced basestation functionality described above together with a switch and G.fast/xDSL modem.

A specific synchronization solution has been developed for synchronizing small cells. This solution, known as Network Listening, Cellular network listen (CNL) or Over The Air (OTA) synchronization, has been developed for synchronizing TDD femtocells, but it can also be applied to Frequency Division Duplexing (FDD) basestations. Network listening is defined in 3GPP technical report TR 36.922, and the corresponding signaling messages are specified in technical standards TS 36.413 and TS 32.592. Using this technique, a residential small cell, or Home eNodeB (HeNB) derives its timing from another synchronized eNodeB (eNB) or HeNB, using the downlink transmission of surrounding cellular basestations to provide a synchronization source for the HeNB.

As discussed in the Small Cell Forum white paper: "Synchronization for LTE small cells", December 2013, Network Listening requires implementing a small subset of UE functionality in the small cell, which functionality may be used to detect adjacent cells and determine their relative timebase frequency error. These adjacent cells may be intra-frequency, inter-frequency (including inter-band), or inter-RAT (Radio Access Technology). Network Listening is based on the premise that some cells have an accurate frequency source. It is therefore possible for a small cell to synchronize its timebase frequency clock to the timebase frequency of these adjacent cells and still meet its own frequency stability requirements. If implemented with particular care, Network Listening may also be used to achieve phase synchronization. However, in order to achieve this, the location of the cell providing the synchronization signal, as well as that of the small cell receiving the signal, must be known precisely, in order to enable the propagation delay between source cell and receiving cell to be calculated. FIG. 3 shows a representative illustration of Network Listening synchronization, with HeNB1 synchronizing to a signal received from a synchronized eNB. The source cell for the synchronization signal need not necessarily be a macro cell connected to the Global Navigation Satellite System (GNSS), as multi-hop HeNB to HeNB synchronization is envisaged using Network Listening.

Although Network Listening has been defined for femtocells in TR 36 922, some aspects of the solution remain poorly specified, and the solution may not be well integrated with overall network synchronisation solutions.

In one example issue, coverage problems may mean that a high quality reference signal for delivery over the radio link may not always be available. In addition, it is necessary to avoid a situation in which a group of small cells use Network Listening to synchronise to each other, so forming a timing loop and drifting together from the network timing signal. From an implementation point of view, significant additional operational cost is required to deliver phase synchronisation, as the exact location of the synchronising small cell and the source of the synchronisation signal must be known. Distances between the source cell and synchronising small cell may be outside the control of the network operator, and could result in additional complexity in achieving phase synchronisation.

SUMMARY

It is an aim of the present invention to provide a method and apparatus which obviate or reduce at least one or more of the disadvantages mentioned above.

According to a first aspect of the present invention, there is provided a method, in a synchronisation control unit, for synchronising a plurality of distributed devices with a network, the method comprising receiving a wireless synchronisation signal from a network node over a wireless channel, processing the received synchronisation signal, and transmitting the processed synchronisation signal to the plurality of distributed devices over a local connection which is different to the wireless channel over which the wireless synchronisation signal is received.

The network may be a telecommunication network such as a network operating according to the 3GPP Long Term Evolution (LTE) standard. The received wireless synchronisation signal may be a Network Listening signal, for example received from a basestation in a communication network.

According to embodiments of the invention, processing the received synchronisation signal may comprise recovering the phase of the synchronisation signal by correcting for a wireless transmission delay between the network node and the synchronisation control unit. In this manner, embodiments of the invention may centralise the execution of phase recovery calculations, avoiding the need to enable this processing in the distributed devices and simplifying the calculations by requiring only a single location for the element receiving the wireless synchronisation signal.

According to embodiments of the invention, the method may further comprise receiving a network timing signal over a packet network, calibrating the received timing signal to the recovered phase of the processed synchronisation signal, and associating an absolute time from the received timing signal to the processed synchronisation signal. In this manner, embodiments of the invention may provide not only frequency and phase synchronisation for the plurality of distributed devices but also an absolute time reference.

According to embodiments of the invention, the method may further comprise transmitting the associated absolute time to at least one of the plurality of distributed devices over the local connection. Thus any or all of the distributed devices which may require an absolute time reference may be provided with such a reference.

According to embodiments of the invention, the received network timing signal may comprise a Timing Protocol signal. The Timing Protocol signal may be a Precision Time Protocol signal according to standard IEEE 1588 or a Network Time Protocol signal according to standard RFC 5905 or RFC 1305.

According to embodiments of the invention, the method may further comprise calculating a constant offset of the network timing signal with respect to the received synchronisation signal.

According to embodiments of the invention, the method may further comprise, if the received synchronisation signal becomes unavailable, correcting the received network timing signal according to the calculated constant offset, and transmitting the corrected network timing signal to the plurality of distributed devices over the local connection. Embodiments of the invention thus provide redundancy, ensuring that an accurate timing signal for the distributed devices may be provided even when the received synchronisation signal becomes unavailable.

According to embodiments of the invention, the method may further comprise receiving a second synchronisation signal from a second network node over a second wireless channel, processing the second received synchronisation signal, identifying a subset of the distributed devices, selecting one of the processed synchronisation signal or the second processed synchronisation signal as corresponding to the identified subset of distributed devices, and transmitting the selected one of the processed synchronisation signal or the second processed synchronisation signal to the identified subset of distributed devices over the local connection. Different devices may in this manner be synchronised to different network synchronisation signals, received from different network nodes.

According to embodiments of the invention, the network node may comprise a basestation of a communication network. The basestation may for example be a NodeB, eNodeB, Home eNodeB, femtocell etc.

According to embodiments of the invention, at least one of the plurality of distributed devices may comprise a small cell basestation. The small cell basestation may be a residential small cell basestation. In some embodiments, all of the distributed devices may be small cell basestations, and may for example be residential small cell basestations. Alternatively the devices may be femtocells or any other device requiring frequency, phase and/or time synchronisation.

According to embodiments of the invention, the synchronisation control unit may be co-located with a network access node. In some embodiments, the network access node may be DSLAM, a residential Gateway, a local switch, a local exchange office etc.

According to embodiments of the invention, the local connection may comprise a non-wireless connection.

According to embodiments of the invention, the non-wireless connection may comprise a Digital Subscriber Line (DSL) connection. In some embodiments, the DSL connection may operate according to at least one of the standards G.993.2, G.993.5 and/or G9701.

According to another aspect of the present invention, there is provided a computer program product configured, when run on a computer, to carry out a method according to the first aspect of the present invention.

According to another aspect of the present invention, there is provided a synchronisation control unit configured to synchronise a plurality of distributed devices with a network, the synchronisation control unit comprising a wireless receiving unit configured to receive a wireless synchronisation signal from a network node over a wireless channel, a processing unit configured to process the received synchronisation signal, and a transmitting unit configured to transmit the processed synchronisation signal to the plurality of distributed devices over a local connection which is different to the wireless channel over which the wireless synchronisation signal is received.

The network may be a telecommunication network such as a network operating according to the 3GPP Long Term Evolution (LTE) standard. The received wireless synchronisation signal may be a Network Listening signal, for example received from a basestation in a communication network.

According to embodiments of the invention, the processing unit may be configured to recover the phase of the synchronisation signal by correcting for a wireless transmission delay between the network node and the synchronisation control unit.

According to embodiments of the invention, the synchronisation control unit may further comprise a digital receiving unit configured to receive a network timing signal over a packet network, a calibrating unit configured to calibrate the received timing signal to the recovered phase of the processed synchronisation signal, and a timing unit configured to associate an absolute time from the received timing signal to the processed synchronisation signal.

According to embodiments of the invention, the transmitting unit may be further configured to transmit the associated absolute time to at least one of the plurality of distributed devices over the local connection.

In some embodiments of the invention, the received network timing signal may comprise a Timing Protocol signal. The Timing Protocol signal may be a Precision Time Protocol signal according to standard IEEE 1588 or a Network Time Protocol signal according to standard RFC 5905 or RFC 1305.

According to embodiments of the invention, the synchronisation control unit may further comprise a calculating unit configured to calculate a constant offset of the network timing signal with respect to the received synchronisation signal.

According to embodiments of the invention, the synchronisation control unit may further comprise a backup unit configured, if the received synchronisation signal becomes unavailable, to correct the received network timing signal according to the calculated constant offset and to forward the corrected network timing signal to the transmitting unit for transmission to the plurality of distributed devices over the local connection.

According to embodiments of the invention, the wireless receiving unit may be further configured to receive a second synchronisation signal from a second network node over a second wireless channel and the processing unit may be further configured to process the second received synchronisation signal. According to such embodiments, the synchronisation control unit may further comprise an identifying unit configured to identify a subset of the distributed devices, and a selecting unit configured to select one of the processed synchronisation signal or the second processed synchronisation signal as corresponding to the identified subset of distributed devices and to forward the selected one of the processed synchronisation signal or the second processed synchronisation signal to the transmission unit for transmission to the identified subset of distributed devices over the local connection.

According to some embodiments, the network node from which the synchronisation signal is received may be a basestation of a communication network such as a NodeB, eNodeB, Home eNodeB, femtocell etc. At least one of the plurality of distributed devices may comprise a small cell basestation such as a residential small cell basestation. Alternatively the devices may be femtocells or any other device requiring frequency, phase and/or time synchronisation.

According to embodiments of the invention, the synchronisation control unit may be incorporated into a network access node. The network access node may for example be a DSLAM, a residential Gateway, a local switch, a local exchange office etc.

According to embodiments of the invention, the local connection may comprise a non-wireless connection.

According to embodiments of the invention, the non-wireless connection may comprise a Digital Subscriber Line (DSL) connection. The DSL connection may operate according to at least one of the standards G.993.2, G.993.5 and/or G9701.

According to another aspect of the present invention, there is provided a synchronisation control unit configured to synchronise a plurality of distributed devices with a network, the synchronisation control unit comprising a processor and a memory, the memory containing instructions executable by the processor whereby the synchronisation control unit is operative to receive a wireless synchronisation signal from a network node over a wireless channel, process the received synchronisation signal, and transmit the processed synchronisation signal to the plurality of distributed devices over a local connection which is different to the wireless channel over which the wireless synchronisation signal is received.

The network may be a telecommunication network such as a network operating according to the 3GPP Long Term Evolution (LTE) standard. The received wireless synchronisation signal may be a Network Listening signal, for example received from a basestation in a communication network.

According to embodiments of the invention, the synchronisation control unit may be further operative to recover the phase of the synchronisation signal by correcting for a wireless transmission delay between the network node and the synchronisation control unit.

According to embodiments of the invention, the synchronisation control unit may be further operative to receive a network timing signal over a packet network, calibrate the received timing signal to the recovered phase of the processed synchronisation signal, and associate an absolute time from the received timing signal to the processed synchronisation signal.

According to embodiments of the invention, the synchronisation control unit may be further operative to transmit the associated absolute time to at least one of the plurality of distributed devices over the local connection.

In some embodiments of the invention, the received network timing signal may comprise a Timing Protocol signal. The Timing Protocol signal may be a Precision Time Protocol signal according to standard IEEE 1588 or a Network Time Protocol signal according to standard RFC 5905 or RFC 1305.

According to embodiments of the invention, the synchronisation control unit may be further operative to calculate a constant offset of the network timing signal with respect to the received synchronisation signal.

According to embodiments of the invention, the synchronisation control unit may be further operative, if the received synchronisation signal becomes unavailable, to correct the received network timing signal according to the calculated constant offset and to transmit the corrected network timing signal to the plurality of distributed devices over the local connection.

According to embodiments of the invention, the synchronisation control unit may be further operative to receive a second synchronisation signal from a second network node over a second wireless channel, process the second received synchronisation signal, identify a subset of the distributed devices, select one of the processed synchronisation signal or the second processed synchronisation signal as corresponding to the identified subset of distributed devices, and transmit the selected one of the processed synchronisation signal or the second processed synchronisation signal to the identified subset of distributed devices over the local connection.

In some embodiments of the invention, the network node from which the synchronisation signal is received may be a basestation of a communication network such as a NodeB, eNodeB, Home eNodeB, femtocell etc. At least one of the plurality of distributed devices may comprise a small cell basestation such as a residential small cell basestation. Alternatively the devices may be femtocells or any other device requiring frequency, phase and/or time synchronisation.

According to embodiments of the invention, the synchronisation control unit may be incorporated into a network access node. The network access node may be a DSLAM, a residential Gateway, a local switch, a local exchange office etc.

According to embodiments of the invention, the local connection may comprise a non-wireless connection.

According to embodiments of the invention, the non-wireless connection may comprise a Digital Subscriber Line (DSL) connection, which may operate according to at least one of the standards G.993.2, G.993.5 and/or G9701.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present invention address issues found in known synchronisation solutions by applying the concept of Network Listening in a centralised manner. The receipt of the wireless synchronisation signal, such as a Network Listening signal, and the processing of the signal, for example to correct for propagation delay, are conducted in a centralised location. The processed synchronisation signal is then transmitted to the devices requiring synchronisation. The transmission of the processed synchronisation signal is conducted over a local connection which is different to the wireless channel over which the wireless synchronisation signal is received. This centralised Network Listening approach may be combined with a timing protocol signal received from a packet network in order to provide an absolute time reference for the synchronised devices as well as offering redundancy, making the solution more robust.

Figure 1:
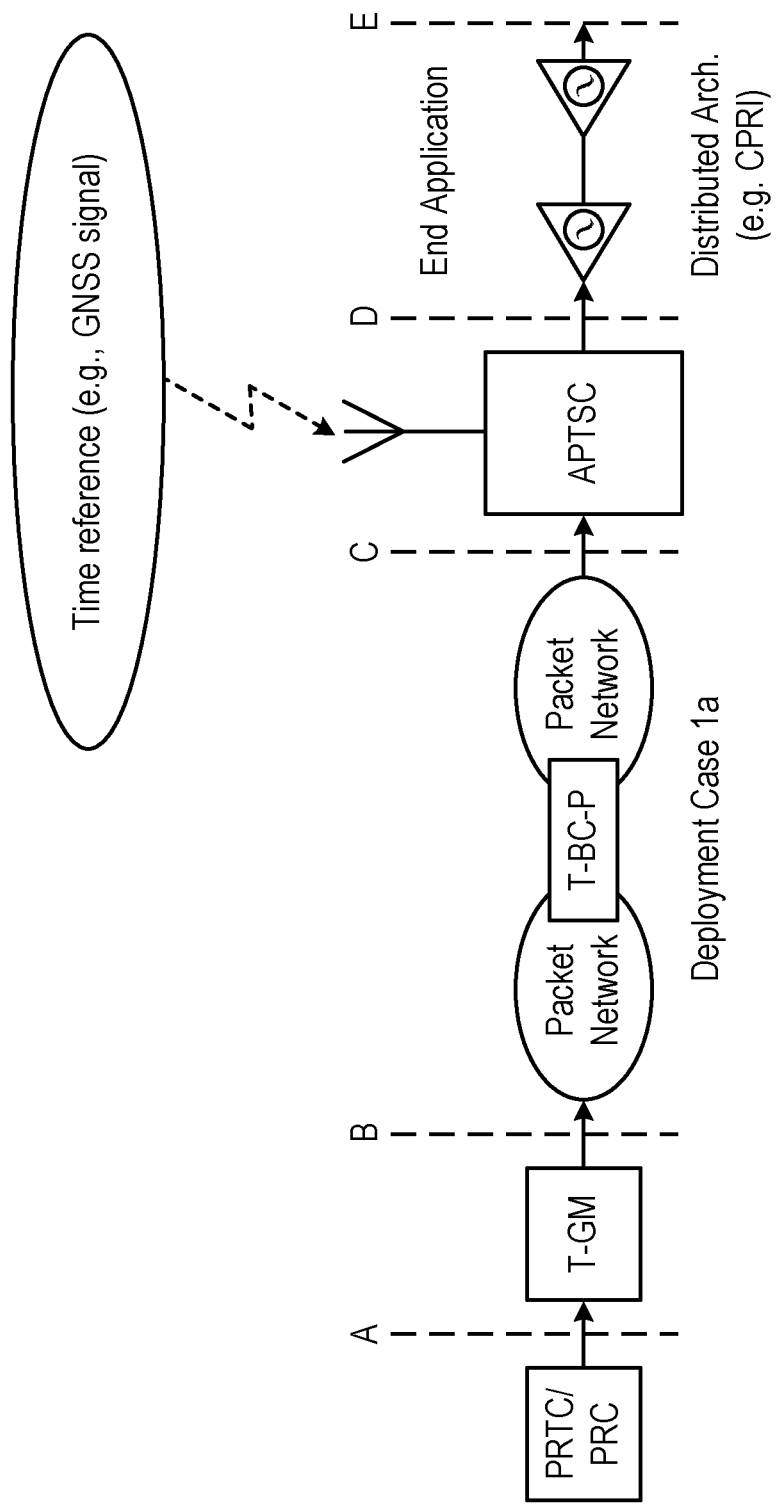
FIG. 1 illustrates an example implementation of Assisted partial Timing Support.
Figure 2:
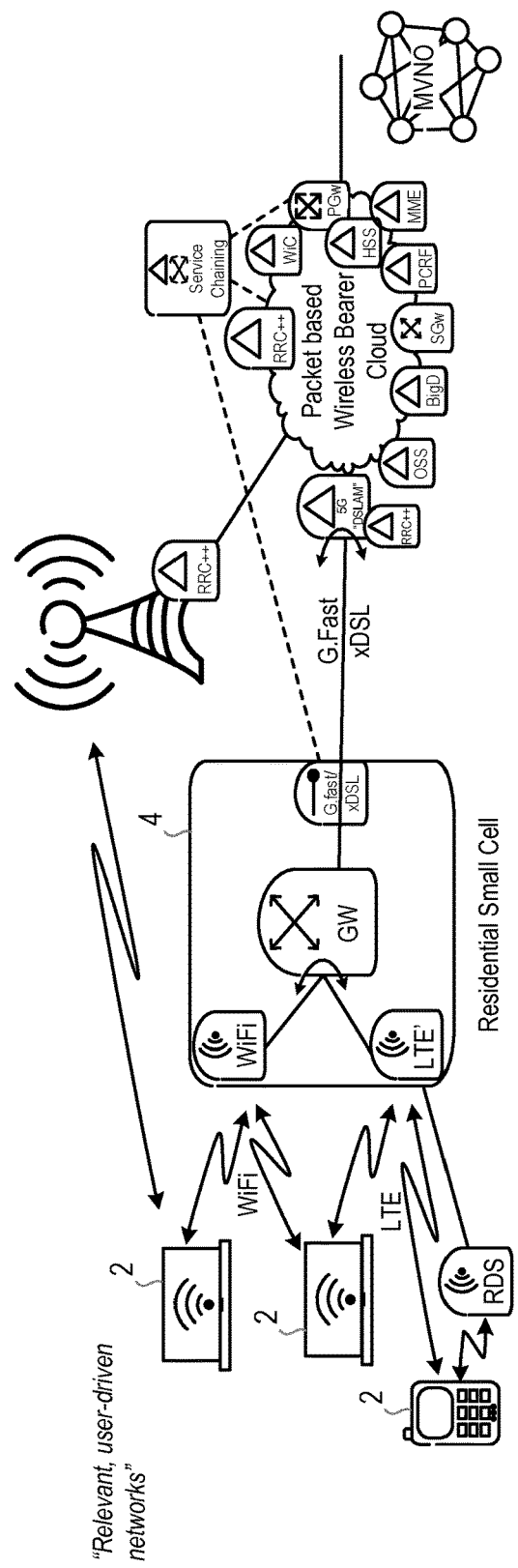
FIG. 2 illustrates an example residential small cell deployment.
Figure 3:
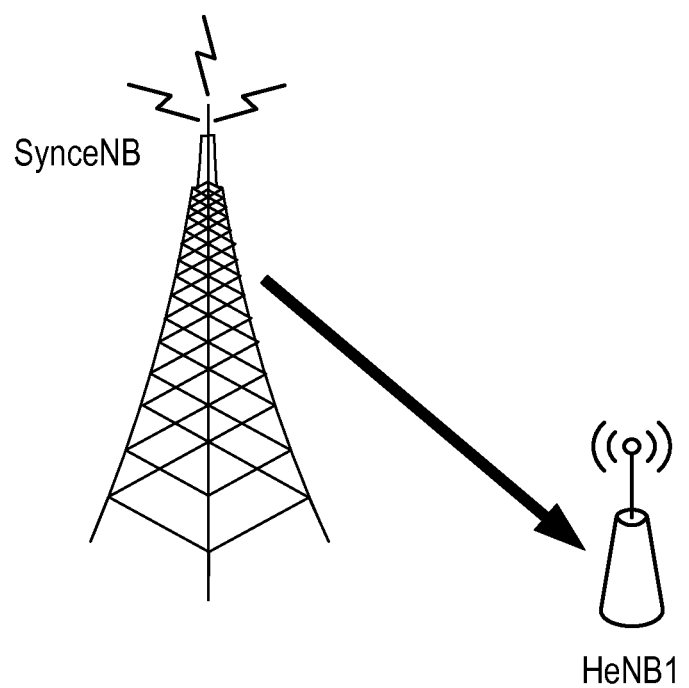
FIG. 3 illustrates synchronisation by Network Listening.
Figure 4:
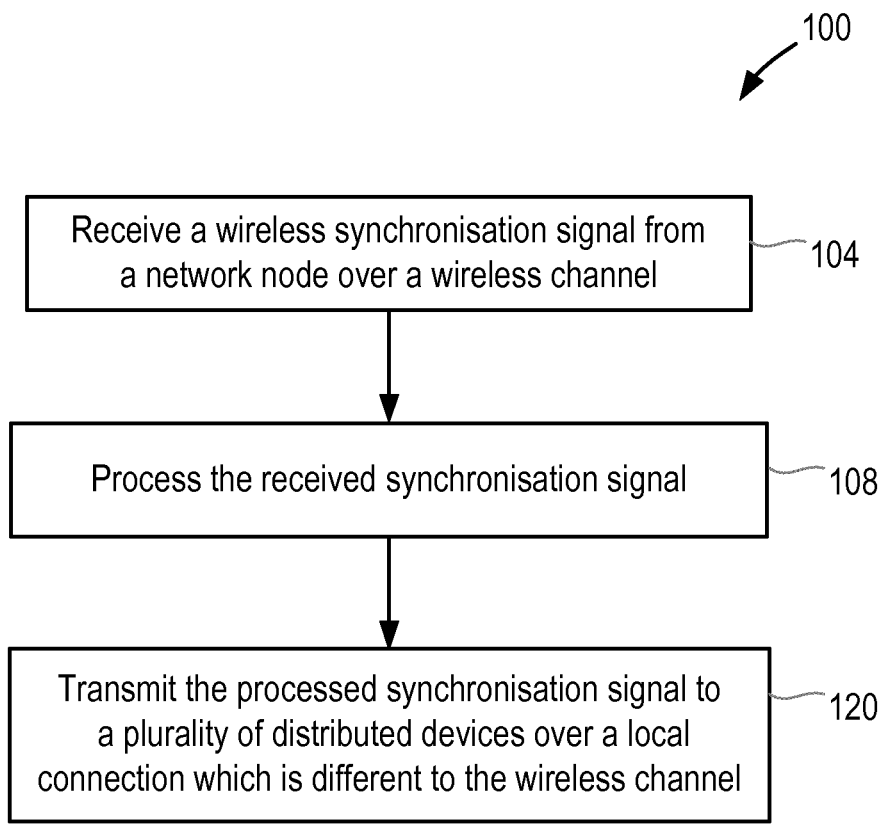
FIG. 4 is a flow chart illustrating process steps in a method for synchronising a plurality of distributed devices with a network.

FIG. 4 is a flow chart illustrating a method, in a synchronisation control unit, for synchronising a plurality of distributed devices with a network. The network may for example be a telecommunication network such as a network operating according to the 3GPP Long Term Evolution (LTE) standard. In one example of the method, the devices to be synchronised may be small cell basestations such as residential small cells or femtocells. In other examples, the devices may be home, industrial or commercial devices having functionality enabling communication over a network, which may be a cellular communication network or may be a public network such as the Internet.

As noted above, the method 100 is conducted in a synchronisation control unit, which may be co-located with a node of the network such as a Gateway, Digital Subscriber Line Access Multiplexer (DSLAM), network access node, local exchange, local switch etc. In a first step 104, the synchronisation control unit receives a wireless synchronisation signal from a network node over a wireless channel. The network node may be any node in the network with which the devices are being synchronised. In one example of the invention, the node is a radio basestation such as an eNodeB or Home eNodeB. The received wireless synchronisation signal may in such examples be a Network Listening synchronisation signal. The network node supplying the synchronisation signal may have an accurate frequency source such as a Global Navigation Satellite System (GNSS) signal or a synchronisation signal received from another network node and corrected for propagation delay.

After receiving the wireless synchronisation signal, the synchronisation control unit then processes the received synchronisation signal at step 108. This may include processing to account for the effects of propagation delay, for example to recover the phase of the synchronisation signal. This processing may therefore involve calculations based upon the relative location of the network node emitting the synchronisation signal and the synchronisation control unit. Finally, the processed synchronisation signal is transmitted to the plurality of distributed devices over a local connection which is different to the wireless channel over which the wireless synchronisation signal is received. The local connection may ensure the "last mile" communication from a local exchange, local access node, residential or commercial gateway, switch, utility pole etc. to individual residential or commercial premises. The local connection may for example be a wired connection such as a DSL connection. Other wired or wireless solutions may also be considered for the local connection enabling communication between the location of the synchronisation control unit and the distributed devices. In this manner, although some minor additional processing of the synchronisation signal may be desirable at the distributed devices, recovery processing to compensate for propagation delay, for example in order to recover phase information, will be significantly simplified at the distributed devices. The method 100 thus enables simplified functionality at the distributed devices by conducting processing of the received wireless synchronisation signal in a central location.

Figure 5:
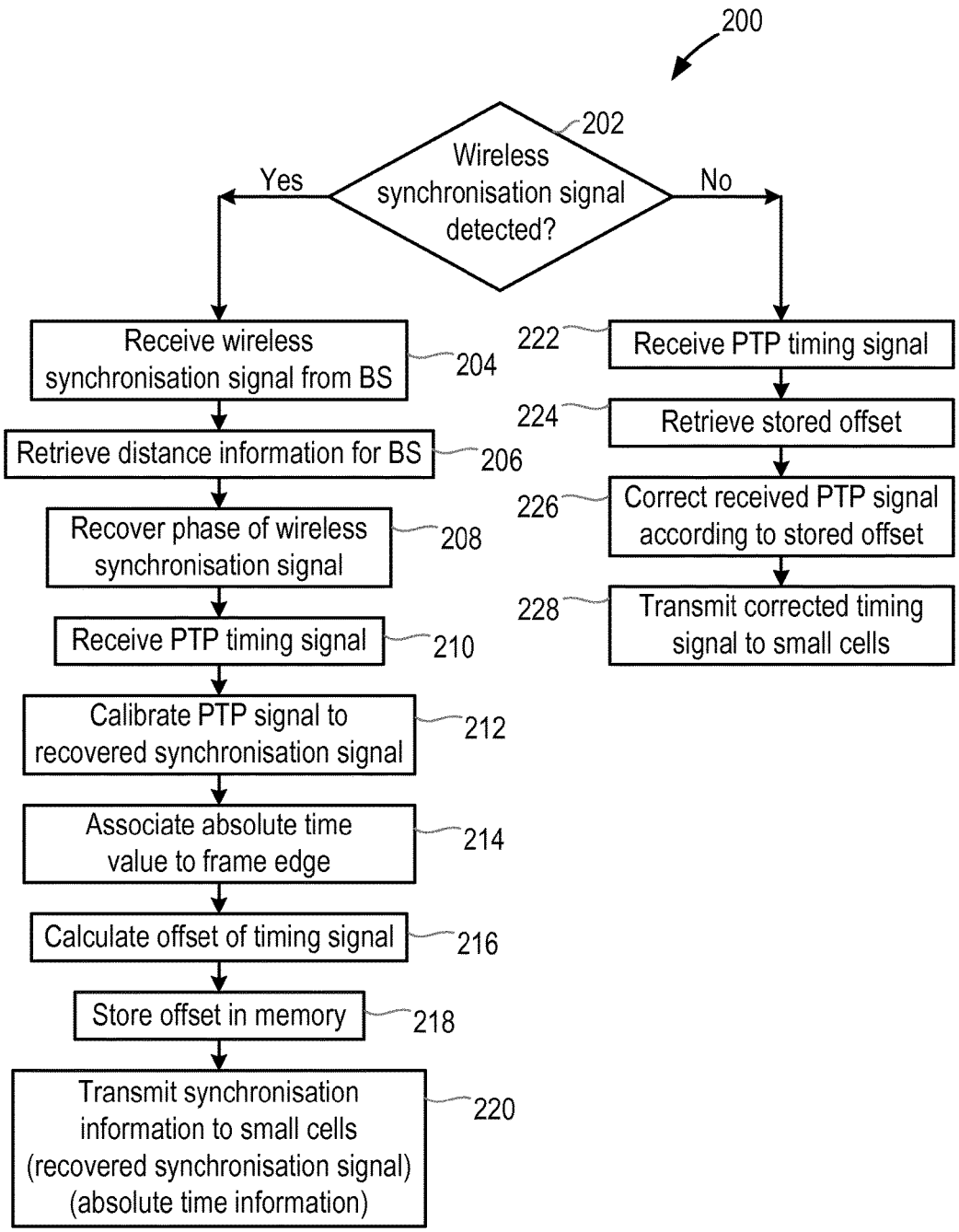
FIG. 5 is a flow chart illustrating process steps in another method for synchronising a plurality of distributed devices with a network.

FIG. 5 is a flow chart illustrating another example of a method 200 for synchronising a plurality of distributed devices with a network, the method 200 being conducted in a synchronisation control unit. The method 200 of FIG. 5 illustrates one example way in which the steps of the method 100 may be implemented in order to achieve the above discussed functionality. The method of FIG. 5 also illustrates optional additional steps which may further improve the synchronisation process of method 100. The method 200 of FIG. 5 is described with reference to the synchronisation of a plurality of residential small cells with a Network Listening signal transmitted by a basestation of a cellular communication network. However, it will be appreciated that this example is for illustrative purposes only, and other applications of the method may be envisaged.

Referring to FIG. 5, in a first step 202, the synchronisation control unit checks to determine whether a wireless synchronisation signal has been detected. In the present example, the wireless synchronisation signal is a Network Listening signal, but other wireless synchronisation signals may be envisaged. If a wireless synchronisation signal is detected at step 202, the synchronisation control unit proceeds to receive the wireless synchronisation signal from the transmitting basestation over a wireless channel at step 204. At step 206, the synchronisation control unit then retrieves distance and/or location information for the transmitting basestation. This information may include the location of the basestation, the distance between the basestation and the synchronisation control unit, or any other data permitting the synchronisation control unit to establish a distance from the transmitting basestation to the receiving synchronisation control unit. Based on the information retrieved in step 206, the synchronisation control unit then recovers the phase of the wireless synchronisation signal in step 208, by correcting the received signal for the propagation delay experienced between the transmitting basestation and the receiving synchronisation control unit.

At step 210, the synchronisation control unit receives a timing protocol signal, such as a Precision Timing Protocol (PTP) signal as specified in IEEE 1588. The synchronisation control unit then associates the absolute time value received in the PTP signal to the frame edge of the recovered phase of the wireless synchronisation signal in step 214. This association permits the calculation, in step 216 of the offset of the PTP signal with respect to the recovered phase of the synchronisation signal. This offset is stored in a memory in step 218. Finally, the synchronisation control unit transmits synchronisation information, including the recovered phase synchronisation signal and the associated absolute time information, to the plurality of distributed residential small cells over a local connection at step 220, thus enabling the residential small cells to synchronise with the communication network. In some examples, the absolute time information may only be transmitted to those residential small cells that require an absolute time reference, for example to enable TDD. This last transmission step may be conducted for example over a local wired connection such as a DSL connection. Alternatively the last transmission step may be conducted over other non-wireless connection means such as fibre optic. In further alternatives, the final transmission step may be conducted over a wireless connection which is different to the wireless channel over which the Network Listening signal was received.

In some example deployment situations, a single synchronisation control unit may be associated with devices synchronising to different networks. Taking the example of a synchronisation control unit co-located with a DSLAM and controlling synchronisation of a plurality of residential small cells, a single DSLAM may not have a one to one correspondence with macro basestation coverage from the residential small cell perspective. Thus in some examples of the method 200, two or more different wireless synchronisation signals may be received by the synchronisation control unit from nodes in different networks. In such cases, the synchronisation control unit retrieves appropriate location data for the transmitting node for each signal and recovers the phase of each original signal according to the retrieved location information. For each received and processed synchronisation signal, the synchronisation control unit then identifies a subset of its associated devices which are synchronising to the network of the received signal, and forwards the processed signal to the identified subset of devices over the local connection.

Figure 6:
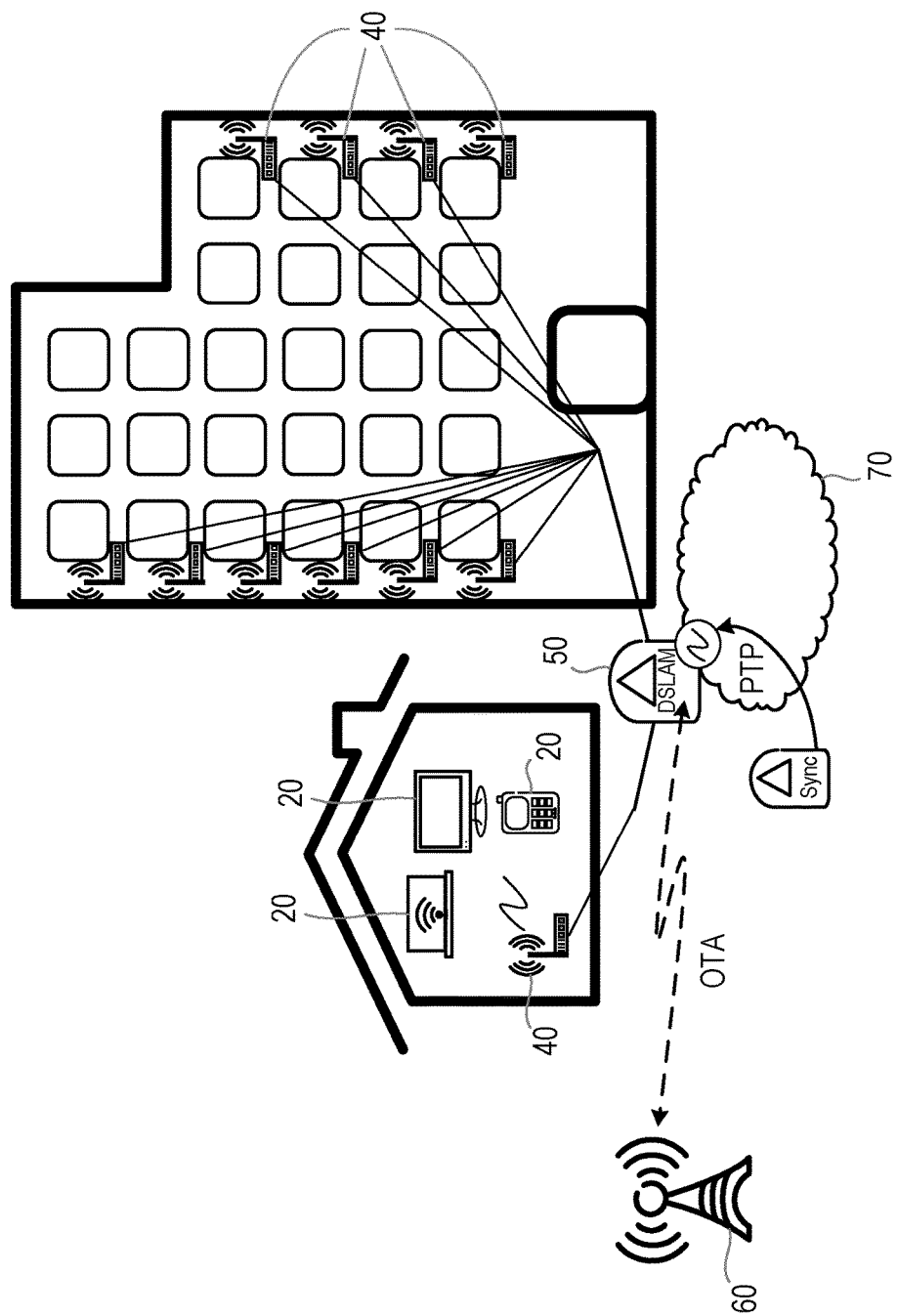
FIG. 6 illustrates a deployment scenario for synchronisation according to an example of the methods of FIGS. 4 and 5.
Figure 7:
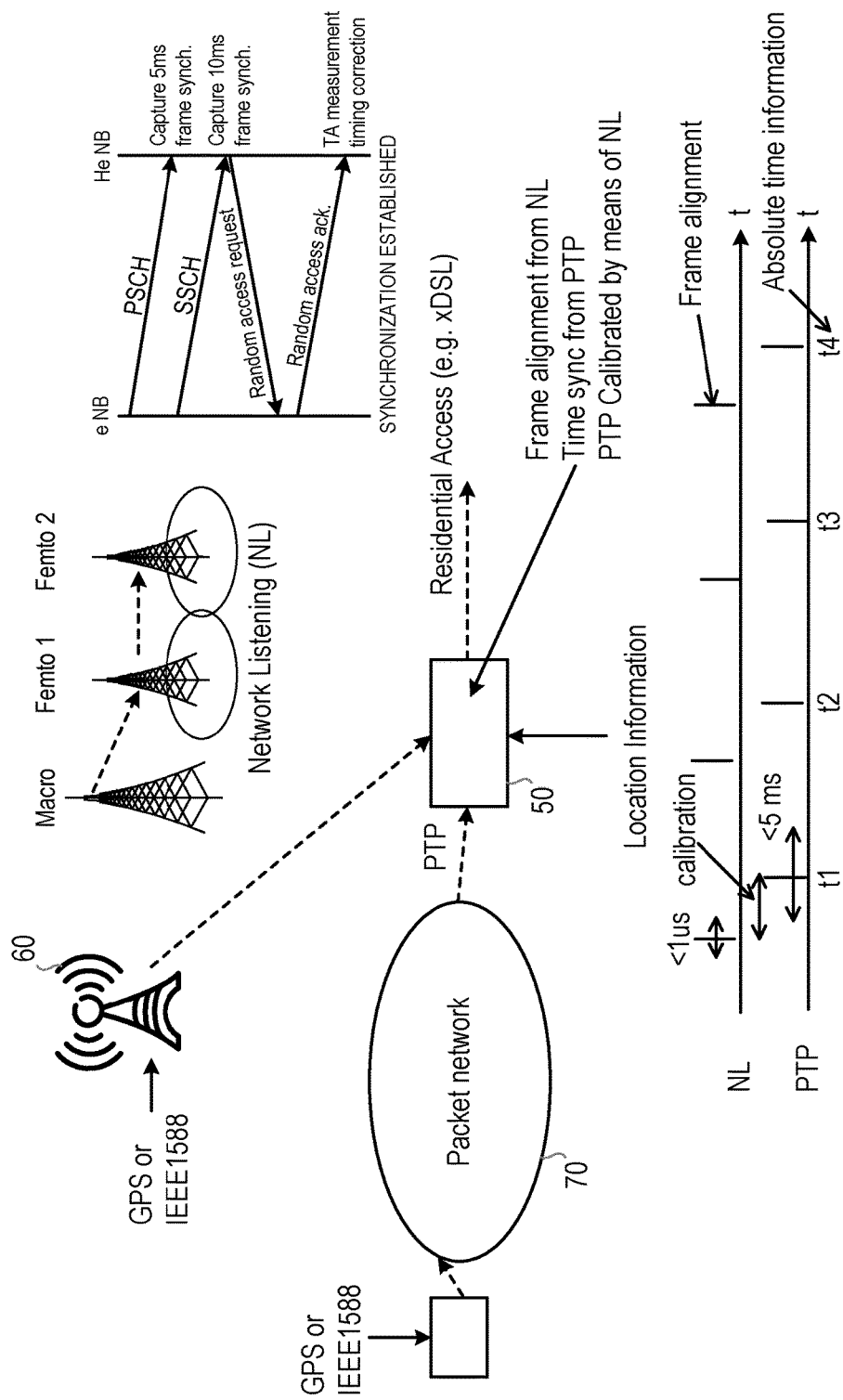
FIG. 7 illustrates synchronisation according to an to an example of the methods of FIGS. 4 and 5.

An example deployment scenario for synchronisation according to either of the methods 100, 200 is illustrated in FIG. 6, and an example synchronisation process according to the methods 100, 200 is illustrated in FIG. 7. In the illustrated example deployment and process, the synchronisation control unit is co-located with a DSLAM 50, which has local connections to residential small cells 40 in different houses and other residential buildings. The residential small cells 40 enable connection of User Equipment devices (UEs) 20 to a cellular communication network. The synchronisation control unit co-located with the DSLAM 50 receives a wireless synchronisation signal from a radio basestation 50, as well as a PTP timing signal via a packet network 70. The synchronisation control unit recovers the phase of the received wireless synchronisation signal, associates the received time signal with the appropriate frame edge of the recovered phase information, and then transmits this synchronisation information via the xDSL connection that exists between the DSLAM 50 and the residential small cells 40.

According to aspects of the present invention, a synchronization control unit, including a receiver of radio signals generated for example by a macro cell, is provided in a centralized location with respect of the devices to be synchronized, in the illustrated examples the residential small cells. The synchronization control unit implements the small subset of UE functionalities that are required to conduct standard Network Listening synchronization. In contrast to standard Network Listening, according to the present invention these functionalities are provided in a centralized location, as opposed to being present in each device that requires synchronization to the network. In the illustrated examples the centralized location is the access node where a DSLAM or corresponding DSL, G.fast or other equipment is located. In alternative examples, these functions could be integrated in any other node of the network having a suitable local connection to the devices for synchronization. An example node might include a residential gateway, which may manage connectivity to several small cells or other connected devices.

The centralized receiving functionality simplifies the identification of the location of the nodes involved in the Network Listening synchronization. Only the location of the transmitting basestation and the access or other node at which the synchronization control unit is located are required. This is in contrast to standard Network Listening in which the location of every small cell synchronizing to the network is required. The simplified location information also simplifies the calibration of the delay between the transmitting node, for example the radio basestation, and the synchronization control unit conducting Network Listening. A location difference of 150 m may equate to a propagation delay of almost 0.5 µs, and accurate distance information is thus highly important for the recovery of phase information. In addition, the centralizing of the Network Listening functionality allows for the use of more expensive components in the synchronization control unit than can be permitted for the distributed synchronizing devices. For example, a single, more accurate oscillator may be implemented in the central location, so enhancing performance when compared with the less accurate but also less expensive oscillators that can be permitted in individual residential small cells, which, owing to the numbers in which they are deployed, are subject to greater cost constraints.

An absolute time reference, for example GPS time, may be associated with the recovered phase information through the use of a timing protocol signal such as IEEE 1588 PTP or Network Time Protocol (NTP), delivered by a time synchronization server over a packet network. This absolute time reference may be required for devices conducting TDD or for minimizing interference. In the illustrated example, and in many practical applications, the IEEE1588 PTP or NTP timing is carried over a network that does not support specific time synchronization functions (for example the IEEE 1588 boundary clock), and the signal is therefore impacted by packet delay variation and by asymmetries in the network. Delay difference between uplink and downlink directly impacts time synchronization accuracy; as an example 1 Km difference would result in approximately 2.5 µs error. According to aspects of the present invention, this delay is compensated for by associating the absolute time reference provided by the PTP signal to the recovered phase of the Network Listening signal. It can be assumed that the accuracy of the timing signal carried over the packet network is within a few ms or perhaps better (100 µs have sometimes been measured over the internet). This error is sufficiently small to enable association of the correct time stamp to a phase edge of the recovered phase of the Network Listening signal. The recovered phase edges are aligned with the phase edges of the transmitting radio basestation and the transmitting basestation itself can be assumed to have access to an accurate time reference such as GPS. By combining the recovered phase edges with the received PTP signal, each phase edge can be aligned with a specific second, as illustrated in FIG. 7.

According to some examples of the methods 100, 200, the offset of the IEEE1588 PTP signal with respect to the recovered phase of the synchronization signal can be calculated and stored during normal operation. The stored offset allows the PTP signal to function as a back up during periods of bad coverage experienced by the transmitting radio basestation or other failure conditions. In the absence of a Network Listening signal, the stored offset can be used to correct the received PTP signal which can then be forwarded to the small cells or other devices for synchronization as a backup signal.

The processed Network Listening signal, with recovered phase information and associated time reference if present, is forwarded to the devices being synchronized (the residential small cells in the illustrated examples). In the case of xDSL transmission between the location of the synchronization control unit and the small cells, this may be according to techniques specified by ITU-T G.993.2 and in the pending new ITU-T recommendation G.9701 (G.fast). According to such techniques, it is possible to deliver accurate frequency synchronization over the physical layer (Network Timing Reference) and to distribute accurate time synchronization. In this manner, additional recovery calculations at the small cells are considerably simplified, simplifying the processing required in such devices.

Figure 8:
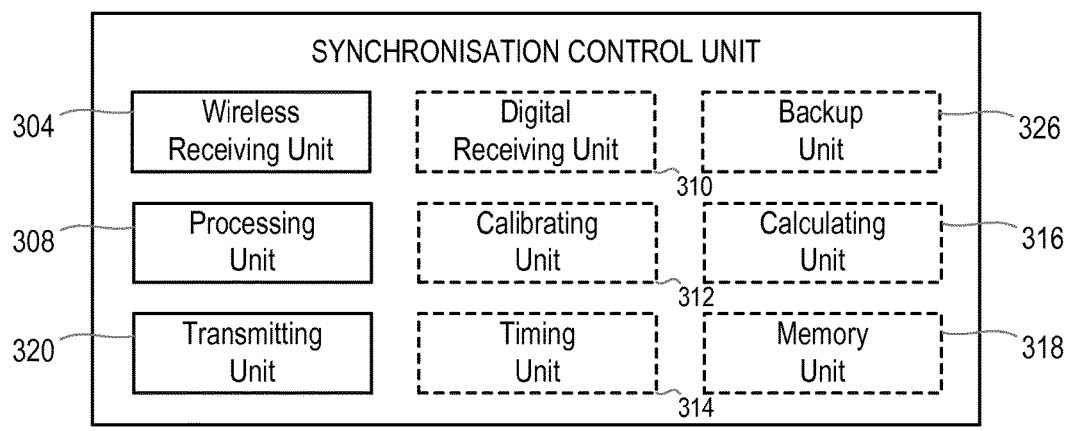
FIG. 8 is a block diagram illustrating functional units in a synchronisation control unit.

FIG. 8 illustrates functional units in a synchronisation control unit 300 which may execute the steps of the methods of FIGS. 4 and 5, for example according to computer readable instructions received from a computer program. The synchronisation control unit 300 comprises a wireless receiving unit 304, a processing unit 308 and a transmitting unit 320. The synchronisation control unit 300 may also comprise a digital receiving unit 310, a calibrating unit 312, a timing unit 314, a backup unit 326, a calculating unit 316, a memory 318 as well as identifying and selecting units (not shown). It will be understood that the units are functional units, and may be realised in any appropriate combination of hardware and/or software.

The wireless receiving unit 304 is configured to receive a wireless synchronisation signal from a network node such as a radio basestation over a wireless channel. The processing unit 308 is configured to process the received synchronisation signal, and may for example be configured to recover the phase of the synchronisation signal by correcting for a wireless transmission delay between the network node and the synchronisation control unit. The transmitting unit 320 is configured to transmit the processed synchronisation signal to a plurality of distributed devices over a local connection which is different to the wireless channel over which the wireless synchronisation signal is received.

If present in the synchronisation control unit 300, the digital receiving unit 310 is configured to receive a network timing signal over a packet network. The received network timing signal may be a PTP signal according to standard IEEE 1588 or an NTP signal according to standard RFC 5905 or RFC 1305. The calibrating unit 312 is configured to calibrate the received timing signal to the recovered phase of the processed synchronisation signal, and the timing unit is configured to associate an absolute time from the received timing signal to the processed synchronisation signal. The transmitting unit 320 may be further configured to transmit the associated absolute time to at least one of the plurality of distributed devices over the local connection.

If present in the synchronisation control unit 300, the calculating unit is configured to calculate a constant offset of the network timing signal with respect to the received synchronisation signal. The backup unit is configured to correct the received network timing signal according to the calculated constant offset in the event that the wireless synchronisation signal becomes unavailable, and to forward the corrected network timing signal to the transmitting unit 314 for transmission to the plurality of distributed devices over the local connection.

As noted above, the synchronisation control unit 300 may be configured to control synchronisation with more than one network. Thus, the wireless receiving unit 304 may be configured to receive a second synchronisation signal from a second network node and the processing unit 308 may be configured to process the second received synchronisation signal. According to such examples, an identifying unit is configured to identify a subset of the distributed devices, and a selecting unit is configured to select one of the processed synchronisation signals as corresponding to the identified subset of distributed devices and to forward the selected processed synchronisation signal to the transmission unit for transmission to the identified subset of distributed devices over the local connection.

Figure 9:
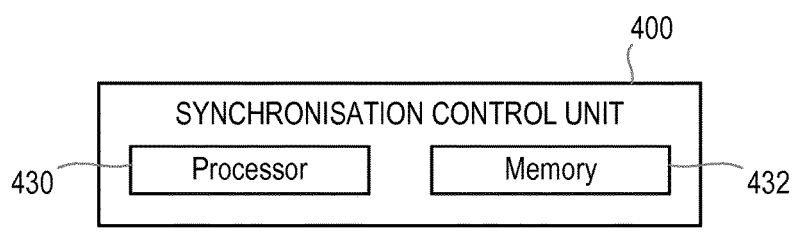
FIG. 9 is a block diagram illustrating functional units in another example of synchronisation control unit.

FIG. 9 illustrates an alternative example of a synchronisation control unit 400, which may implement the methods 100, 200 for example on receipt of suitable instructions from a computer program. Referring to FIG. 9, the synchronisation control unit 400 comprises a processor 430 and a memory 432. The memory 432 contains instructions executable by the processor 430 such that the synchronisation control unit 400 is operative to conduct the steps of the method 100 or the method 200.

As discussed above, the synchronisation control units 300 and/or 400 may be incorporated into a network access node such as a DSLAM, a residential Gateway, a local switch, a local exchange office etc.

The above described examples illustrate how aspects of the present invention provide a synchronisation solution offering advantages over known techniques. By receiving a wireless synchronisation signal centrally, the need to implement appropriate receiving functionality in devices to be synchronised is significantly reduced, thus simplifying such devices and reducing cost. In addition, performance may be improved by using components having greater precision in the central location. Distributed devices are subject to greater cost constraints than those imposed on a centralised component controlling synchronisation of a plurality of devices.

Conducting synchronisation signal processing such as phase recovery in a centralised location also simplifies the distributed devices as such calculations are not then performed in the distributed devices. In addition, the calculations themselves are simplified as only the location of the centralised component is required. Deployment of new distributed devices is also simplified as the precise location of newly deployed devices is not required for phase calculations.

By centrally controlling synchronisation of a plurality of distributed devices, aspects of the present invention ensure that a group of devices do not synchronise between themselves, so forming a timing loop and drifting together.

Aspects of the present invention also enable provision of an absolute time reference so facilitating TDD functionality as well as offering redundancy in the solution in the event of synchronisation signal failure.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer readable medium, or it could, for example, be in the form of a signal such as a downloadable data signal provided from an Internet website, or it could be in any other form.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, in a synchronization control unit, comprising:
   receiving a wireless synchronization signal over a first wireless channel from a radio network node in a wireless communication network;
   recovering a phase of the wireless synchronization signal by correcting for a wireless propagation delay associated with the first wireless channel;
   using the recovered phase to generate a processed synchronization signal having frequency and phase synchronization with the wireless synchronization signal; and
   transmitting the processed synchronization signal to a plurality of distributed devices over a local connection between the synchronization control unit and the plurality of distributed devices, thereby enabling each distributed device to achieve frequency and phase synchronization with the radio network node.

2. The method as claimed in claim 1, further comprising providing an absolute time reference to one or more of the plurality of distributed devices, based on:
   receiving a network timing signal over a packet network that is used to communicatively couple the plurality of distributed devices to the wireless communication network, the network timing signal conveying absolute time values for use by one or more of the distributed devices;
   determining, based on the recovered phase of the wireless synchronization signal, a timing offset between the network timing signal and the wireless synchronization signal; and
   transmitting synchronization information over the local connection to the at least one distributed device, indicating the timing offset, thereby enabling the at least one distributed device to achieve time synchronization with the wireless communication network.

3. The method as claimed in claim 2, wherein the received network timing signal comprises an IEEE 1588 Precision Time Protocol or a Network Time Protocol signal according to RFC 5905 or RFC 1305.

4. The method as claimed in claim 2, further comprising, responsive to the wireless synchronization signal becoming unavailable at the synchronization control unit, generating a corrected network timing signal, based on correcting the network timing signal according to a previously determined timing offset between the network timing signal and the wireless synchronization signal, and transmitting the corrected network timing signal to the plurality of distributed devices, thereby enabling the distributed devices at least temporarily to maintain frequency and phase synchronization with the wireless communication network in the absence of the processed synchronization signal.

5. The method as claimed in claim 1, wherein the radio network node is a first radio network node, the wireless synchronization signal is a first wireless synchronization signal, the processed synchronization signal is a first processed synchronization signal, and the plurality of distributed devices is an identified first subset of distributed devices among a larger plurality of distributed devices, and wherein the method further comprises:
  receiving a second wireless synchronization signal over a second wireless channel from a second radio network node in the wireless communication network;
  recovering a phase of the second wireless synchronization signal by correcting for a wireless propagation delay associated with the second wireless synchronization signal;
  using the recovered phase of the second wireless synchronization signal to generate a second processed synchronization signal having frequency and phase synchronization with the second wireless synchronization signal; and
  transmitting the second processed synchronization signal to an identified second subset of distributed devices over the local connection, such that the identified first subset of distributed devices performs frequency and phase synchronization with respect to the first radio network node and the identified second subset of distributed devices performs frequency and phase synchronization with respect to the second radio network node.

6. The method as claimed in claim 5, further comprising identifying memberships in the first and second subsets.

7. The method as claimed in claim 1, wherein at least one of the plurality of distributed devices comprises a small cell base station.

8. The method as claimed in claim 1, wherein the synchronization control unit is co-located with a network access node that communicatively couples the plurality of distributed devices to the wireless communication network via a packet network.

9. The method as claimed in claim 1, wherein the non-wireless connection comprises a Digital Subscriber Line (DSL) connection.

10. The method as claimed in claim 9, wherein the DSL connection operates according to at least one of the standards G.993.2, G.993.5 and G9701.

11. A non-transitory computer readable storage medium storing a computer program for synchronizing a plurality of distributed devices with a wireless communication network, the computer program comprising program instructions that, when run on a processor of a network node configured as a synchronization control unit, cause the network node to:
  recover a phase of a wireless synchronization signal received by the network node over a first wireless channel from a radio network node in the wireless communication network;
  use the recovered phase to generate a processed synchronization signal having frequency and phase synchronization with the wireless synchronization signal; and
  transmit the processed synchronization signal to the plurality of distributed devices over a local connection between the network node and the plurality of distributed devices, thereby enabling each distributed device to achieve frequency and phase synchronization with the radio network node.

12. A synchronization control unit comprising:
  a wireless receiving circuit configured to receive a wireless synchronization signal over a first wireless channel from a radio network node in a wireless communication network;
  and
  a processing circuit configured to:
    recover a phase of the wireless synchronization signal by correcting for a wireless propagation delay associated with the first wireless channel;
    use the recovered phase to generate a processed synchronization signal having frequency and phase synchronization with the wireless synchronization signal; and
    transmit the processed synchronization signal, via a transmitting circuit of the synchronization control unit, to a plurality of distributed devices over a local connection between the synchronization control unit and the plurality of distributed devices.

13. The synchronization control unit as claimed in claim 12, further comprising:
  a digital receiving circuit configured to receive a network timing signal over a packet network that is used to communicatively couple the plurality of distributed devices to the wireless communication network, the network timing signal conveying absolute time values for use by one or more of the distributed devices: and
  wherein the processing circuit or further circuitry of the synchronization control unit is configured to: determine, based on the recovered phase of the wireless synchronization signal, a timing offset between the synchronization signal; and transmit, via the transmitting circuit, synchronization information over the local connection to at least one distributed device, indicating the timing offset, thereby enabling the at least one distributed device to achieve time synchronization with the wireless communication network.

14. The synchronization control unit as claimed in claim 13, wherein, responsive to the wireless synchronization signal becoming unavailable at the synchronization control unit, the processing circuit or further circuitry of the synchronization control unit is configured to:
  generate a corrected network timing signal, based on correcting the network timing signal according to a previously determined timing offset between the network timing signal and the wireless synchronization signal; and
  transmit, via the transmitting circuit, the corrected network timing signal to the plurality of distributed devices, thereby enabling the distributed devices at least temporarily to maintain frequency and phase synchronization with the wireless communication network in the absence of the processed synchronization signal.

15. The synchronization control unit as claimed in claim 12, wherein the radio network node is a first radio network node, the wireless synchronization signal is a first wireless synchronization signal, the processed synchronization signal is a first processed synchronization signal, and the plurality of distributed devices is an identified first subset of distributed devices among a larger plurality of distributed devices, and wherein the processing circuit or further circuitry of the synchronization control unit is configured to:
  receive, via the wireless receiving circuit, a second wireless synchronization signal over a second wireless channel from a second radio network node in the wireless communication network;

recover a phase of the second wireless synchronization signal by correcting for a wireless propagation delay associated with the second wireless synchronization signal;

use the recovered phase of the second wireless synchronization signal to generate a second processed synchronization signal having frequency and phase synchronization with the second wireless synchronization signal; and transmit, via the transmitting circuit, the second processed synchronization signal to an identified second subset of distributed devices over the local connection, such that the identified first subset of distributed devices performs frequency and phase synchronization with respect to the first radio network node and the identified second subset of distributed devices performs frequency and phase synchronization with respect to the second radio network node.

16. The synchronization control unit as claimed in claim 12, wherein the synchronization control unit is incorporated into a network access node that communicatively couples the plurality of distributed devices to the wireless communication network via a packet network.

17. The synchronization control unit as claimed in claim 12, wherein the local connection comprises a non-wireless connection.

18. The synchronization control unit as claimed in claim 17, wherein the non-wireless connection comprises a Digital Subscriber Line (DSL) connection.

* * * * *